United States Patent
Kai et al.

(10) Patent No.: US 8,472,768 B2
(45) Date of Patent: Jun. 25, 2013

(54) FLEXIBLE PLASTIC OPTICAL FIBER CABLE

(75) Inventors: Hideaki Kai, Tokyo (JP); Seiji Sasho, Tokyo (JP); Hajime Munekuni, Tokyo (JP)

(73) Assignee: Asahi Kasei E-Materials Corporation, Tokyo (JP)

( * ) Notice: Subject to any disclaimer, the term of this patent is extended or adjusted under 35 U.S.C. 154(b) by 42 days.

(21) Appl. No.: 12/598,267

(22) PCT Filed: Sep. 19, 2007

(86) PCT No.: PCT/JP2007/068133
§ 371 (c)(1),
(2), (4) Date: Oct. 30, 2009

(87) PCT Pub. No.: WO2009/037742
PCT Pub. Date: Mar. 26, 2009

(65) Prior Publication Data
US 2010/0135622 A1   Jun. 3, 2010

(51) Int. Cl.
*G02B 6/44*   (2006.01)

(52) U.S. Cl.
USPC .......................................... 385/106; 385/102

(58) Field of Classification Search
USPC .................................. 385/100–114
See application file for complete search history.

(56) References Cited

U.S. PATENT DOCUMENTS

| | | | |
|---|---|---|---|
| 5,734,773 A | 3/1998 | Teshima et al. | |
| 2003/0072546 A1 * | 4/2003 | Shimada et al. | 385/102 |
| 2003/0156811 A1 * | 8/2003 | Ino et al. | 385/128 |
| 2005/0238300 A1 * | 10/2005 | Jamet et al. | 385/100 |
| 2006/0140572 A1 * | 6/2006 | Ruiz | 385/147 |
| 2010/0254668 A1 * | 10/2010 | Consonni et al. | 385/102 |

FOREIGN PATENT DOCUMENTS

| | | |
|---|---|---|
| JP | 61-217009 A | 9/1986 |
| JP | 7-77642 A | 3/1995 |
| JP | 10-111427 A | 4/1998 |
| JP | 11-95048 A | 4/1999 |
| JP | 11-237513 A | 8/1999 |
| JP | 2003-244295 A | 8/2003 |
| JP | 2003-315643 A | 11/2003 |
| JP | 2004-252401 A | 9/2004 |
| JP | 2005-332883 A | 12/2005 |
| WO | WO-95/32442 A1 | 11/1995 |

* cited by examiner

*Primary Examiner* — Ryan Lepisto
*Assistant Examiner* — Jerry Blevins
(74) *Attorney, Agent, or Firm* — Birch, Stewart, Kolasch & Birch, LLP

(57) ABSTRACT

A plastic optical fiber cable that is strong in repeated flexure, ensuring low light loss at bending with a bend radius of 2 mm. The plastic optical fiber cable is one composed of a multicore plastic optical fiber strand including 7 to 10,000 cores of transparent resin, island portions each consisting of at least one core-surrounding sheath layer of transparent resin with a refractive index lower than that of the transparent resin constituting the cores and sea portion of resin surrounding the island portions and, enclosing the multicore plastic optical fiber strand, a coating layer, characterized in that the resin constituting at least either the sheath layer or sea layer is one of 25 to 55 Shore D hardness while the resin constituting the coating layer consists of a thermoplastic resin of 500 to 2000 MP flexural modulus.

6 Claims, 2 Drawing Sheets

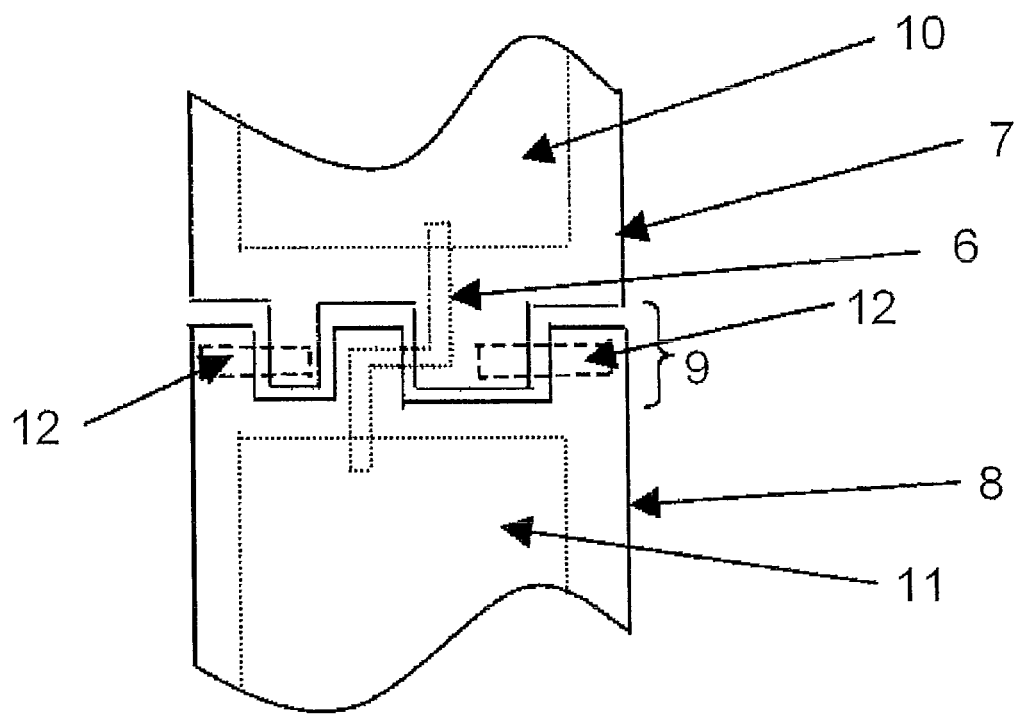

FLEXIBLE PLASTIC OPTICAL FIBER CABLE

TECHNICAL FIELD

The present invention relates to a plastic optical fiber cable used for short-distance optical signal transmission. In particular, the invention relates to a plastic optical fiber cable suitably used in a portable electronic equipment that includes two casings both having a hinge structure section for opening and closing, such as mobile phones and mobile computers, for transmitting optical signals through the hinge structure section.

BACKGROUND ART

Plastic optical fibers are being used mostly in areas such as short-distance optical signal transmission and sensors, because they are more flexible than silica optical fibers, and besides their end-face processing or connection is easy if they are fabricated to have a large diameter and high numerical aperture.

Of plastic optical fibers having been put to practical use, plastic optical fiber strands are being widely used which use as a core material a highly clear resin, such as a copolymer composed mainly of methyl methacrylate (poly(methyl methacrylate)-based resin) or polycarbonate resin, and as a cladding material a vinylidene fluoride-based copolymer or methacrylate fluoride-based copolymer.

These plastic optical fiber strands are generally used in the form of plastic optical fiber cables, which are produced by applying to the outside of the cladding layer a coating layer of, for example, a low-density polyethylene, poly(vinyl chloride) or polyamide so as to prevent the degradation of their optical properties due to scratches or the like.

In recent years, attempts have been made to use plastic optical fibers in a portable electronic equipment that includes two casings both having a hinge structure section to connect signals between the two casings (see Patent Document 1). The existing plastic optical fiber cables using plastic optical fiber strands whose outside diameter is 0.7 mm, however, have a performance limitation such that the cables break, when subjected to bend test with a bend radius of 2 mm and at a bending angle of ±90°, after 100,000-time or less repeated bending.

One possible approach to improving the flexure resistance in the bend test is to decrease the outside diameter of the plastic optical fiber strands and bundle the plurality of plastic optical fiber strands to compensate for the light attenuation. Plastic optical fiber cables have been proposed based on the above idea and are on the market which are produced by bundling 4 single-core plastic optical fiber strands as thin as 0.265 mm in outside diameter and coating the bundle with polyethylene. However, cables produced by using thin plastic optical fiber strands in a bundle also create problems of: their being difficult to connect, because their coating layer must be removed when they are connected and the thin plastic optical fiber strands become apart; and causing a large optical loss due to connecting.

There have also been proposed multi-core plastic optical fiber strands, as multi-core plastic optical fibers which can withstand the environment in the high-temperature region of the order of 80 to 110° C., which are made up of: a core resin of poly(methyl methacrylate)-based; and a cladding resin of vinylidene fluoride/tetrafluoroethylene/hexafluoropropene tertiary polymer having a Shore D hardness in the range of 30 to 55 (see Patent Document 2).

There have also been proposed plastic optical fiber cables, as plastic optical fiber cables having excellent heat resistance, flame resistance, oil resistance and chemical resistance, which are produced by coating the outside of plastic optical fiber strands consisting of a core and a cladding with fluorine-containing polyolefin resin and further with nylon 12 resin (see Patent Document 3).

[Patent Document 1] Japanese Patent Laid-Open No. 2003-244295
[Patent Document 2] Japanese Patent Laid-Open No. 11-95048
[Patent Document 3] Japanese Patent Laid-Open No. 7-77642

DISCLOSURE OF THE INVENTION

Problems to be Solved by the Invention

An object of the present invention is to provide a plastic optical fiber cable capable of withstanding repeated bending and keeping optical loss low when it is bent with a bend radius of 2 mm.

Means for Solving the Problems

After close examination of the above problems, the present inventors has found that the above problems can be solved by using, as a plastic optical fiber strand, a multi-core-structure optical fiber strand whose cladding layer or sea part is formed of a soft resin; and applying to the optical fiber strand a coating layer formed of a thermoplastic resin with a high flexural modulus, thereby completing the present invention.

Specifically, a first aspect of the present invention is a plastic optical fiber cable, including: a multi-core plastic optical fiber strand comprising island parts made up of 7 or more and 10000 or less cores each formed of a transparent resin and of at least one cladding layer surrounding each of the cores and formed of a transparent resin with a refractive index lower than that of the transparent resin forming the cores; and a sea part surrounding each of the island parts and formed of a resin; and a coating layer, which surrounds the multi-core plastic optical fiber strand, wherein the resin forming at least one of the cladding layer and the sea part is a resin having a Shore D hardness of 25 or more and 55 or less, and the resin forming the coating layer is a thermoplastic resin having a flexural modulus of 500 MPa or more and 2000 MPa or less.

In the plastic optical fiber cable of the present invention, preferably, the transparent resin forming the cores is a poly(methyl methacrylate)-based resin, the transparent resin forming the cladding layer is a tetrafluoroethylene/hexafluoropropylene/vinylidene fluoride copolymer having a Shore D hardness of 25 or more and 55 or less, and the resin forming the sea part is a vinylidene fluoride/tetrafluoroethylene copolymer. Also preferably, the transparent resin forming the cores is a poly(methyl methacrylate)-based resin, the transparent resin forming the cladding layer is a vinylidene fluoride/tetrafluoroethylene copolymer, and the resin forming the sea part is a tetrafluoroethylene/hexafluoropropylene/vinylidene fluoride copolymer having a Shore D hardness of 25 or more and 55 or less. Preferably, the coating layer is formed of nylon 12. Preferably, the multi-core plastic optical fiber strand has an outside diameter of 0.1 mm or more and 0.7 mm or less.

A second aspect of the present invention is a connecting method, which is used in a portable electronic equipment having a display control circuit board and a display section in casings, comprising connecting the display control circuit board and the display section by using the plastic optical fiber cable according to the first aspect of the present invention.

A third aspect of the present invention is a connecting method, which is used in a portable electronic equipment having a camera section and a data processing section in casings, comprising connecting the camera section and the data processing circuit board by using the plastic optical fiber cable according to the first aspect of the present invention.

A fourth aspect of the present invention is a connecting method, which is used in a portable electronic equipment including a first casing and a second casing both having a hinge structure section that allows folding operation to take place, comprising connecting a first module in the first casing and a second module in the second casing by passing a plastic optical fiber cable according to the first aspect of the present invention through the hinge structure section.

A fifth aspect of the present invention is a connecting method, which is used in a portable electronic equipment comprising a first casing and a second casing both having a hinge structure section that allows rotating operation and folding operation to take place, comprising connecting a first module in the first casing and a second module in the second casing by passing a plastic optical fiber cable according to the first aspect of the present invention through the hinge structure section.

ADVANTAGES OF THE INVENTION

The plastic optical fiber cable of the present invention is produced by using a plastic optical fiber strand having a multi-core structure, whereby it can keep optical loss low when it is bent with a bend radius of 2 mm. Further, its cladding layer or sea part is formed of a specific resin and its coating layer is formed of a thermoplastic resin having a flexural modulus in the specific range, whereby it can show very excellent resistance to repeated flexing.

BRIEF DESCRIPTION OF THE DRAWINGS

FIG. 2 is an illustration of the connecting section of a portable electronic equipment having a hinge structure section, to which the present invention is related, that allows folding operation to take place.

Figure 1:
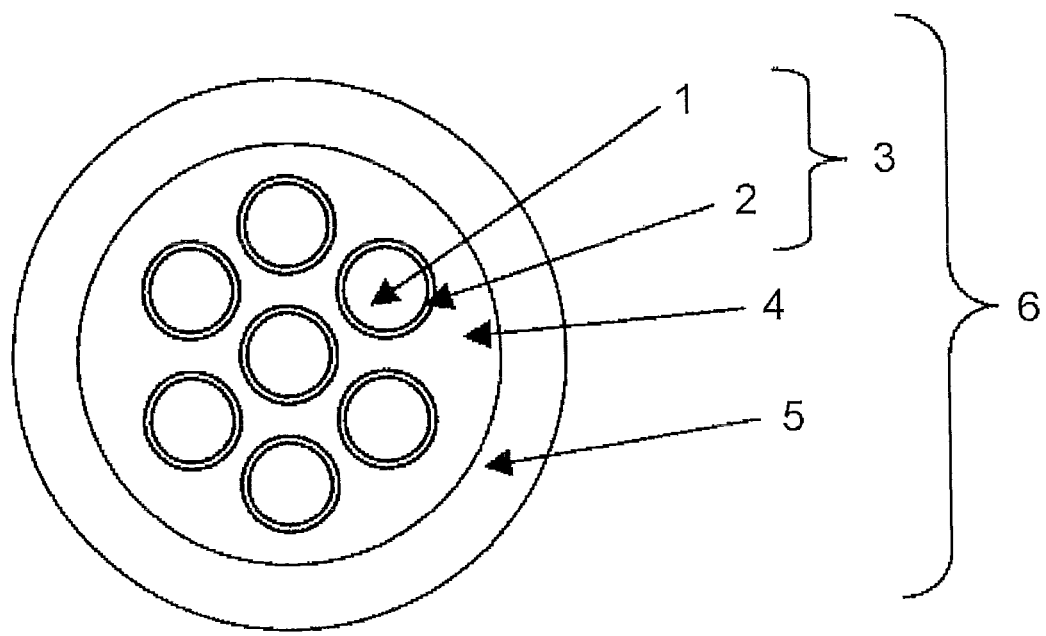
FIG. 1 is a schematic cross section through a plastic optical fiber cable of the present invention.

DESCRIPTION OF SYMBOLS 1 core
2 cladding layer
3 island part
4 sea part
5 coating layer
6 plastic optical fiber cable
7 first casing
8 second casing
9 hinge structure section
10 first module
11 second module
12 rotating shaft

BEST MODE FOR CARRYING OUT THE INVENTION

FIG. 1 schematically shows a cross section through a plastic optical fiber cable of the present invention. In the figure, numeral 1 denotes a core, numeral 2 denotes a cladding layer, numeral 3 denotes an island part, and numeral 4 denotes a sea part. The plastic optical fiber cable of the present invention, which is denoted with numeral 6, further includes a coating layer, which is denoted with 5.

In the present invention, each core is formed of a transparent resin. Examples of transparent resins may include poly (methyl methacrylate)-based resin and polycarbonate-based resin. Of these resins, poly(methyl methacrylate)-based resin, which is highly transparent, is preferable. The number of the cores is preferably 7 or more and 10000 or less, and more preferably 37 or more and 3000 or less. If the number of the cores is 7 or more, the cable can keep optical loss low when it is bent, and if the number is 10000 or less, the cable can keep the loss of the total light quantity low.

"Poly(methyl methacrylate)-based resin" herein used means transparent polymers containing 80% by mass or more methyl methacrylate as a monomer component, including homopolymers of methyl methacrylate; and copolymers of methyl methacrylate with one or more components selected from the group consisting of acrylic ester, methacrylic ester, acrylic acid, methacrylic acid and maleimide.

Poly(methyl methacrylate)-based resin can be preferably used in the present invention, which has a melt flow index in the range of 0.1 to 45 g/10 min under the following conditions: temperature: 230° C., loading: 3.8 kg, orifice diameter: 2 mm, and orifice length: 8 mm.

In the present invention, cladding layers surround the respective cores and are formed of a transparent resin with refractive index lower than that of the transparent resin used for the cores. In the case where the resin forming the cores is the above described poly(methyl methacrylate)-based resin, the resin forming the cladding layers is preferably a transparent fluorine resin or a transparent mixed resin that contains a fluorine resin. Examples of such transparent fluorine resins may include transparent vinylidene fluoride-based resins and the like.

"Transparent vinylidene fluoride resin" herein used means any one selected from the group consisting of: binary polymers of vinylidene fluoride with hexafluoroacetone; tertiary or quaternary polymers of any one component of the above binary polymers with trifluoroethylene or tetrafluoroethylene or both; binary polymers of vinylidene fluoride with hexafluoropropylene; tertiary or quaternary polymers of any one component of the above binary polymers with trifluoroethylene or tetrafluoroethylene or both; binary polymers of vinylidene fluoride with tetrafluoroethylene; and binary polymers of vinylidene fluoride with trifluoroethylene.

In the present invention, the sea part surrounds the cores surrounded by the respective cladding layers, that is, 7 to 10000 island parts to constitute a multi-core plastic optical fiber strand. The resin that constitutes the sea part (hereinafter sometimes referred to as "sea resin") is preferably the above described transparent fluorine resin or a mixed resin containing the above described transparent fluorine resin. Examples of such resins may include the above described transparent vinylidene fluoride-based resin; and mixed resins of the transparent resin with poly(methyl methacrylate)-based resin or poly(ethyl methacrylate)-based resin.

Of the above described transparent fluorine resins and mixed resins containing a transparent fluorine resin, those having a melt flow index in the range of 1 to 200 g/10 min under the following conditions: temperature: 230° C., loading: 3.8 kg, orifice diameter: 2 mm, and orifice length: 8 mm are preferably used. The thickness of each cladding layer is preferably 1 μm to 50 μm. Each cladding layer may be made up of a single layer or two or more layers. Preferably, the core resin accounts for 50% to 85% of the area of the cross section through the optical fiber strand.

In the combination of the above described cladding layers and the above described sea part, it is particularly preferable that the transparent resin forming the clad layers is a tetrafluoroethylene/hexafluoropropylene/vinylidene fluoride copolymer having a Shore D hardness of 25 or more and 55 or less and the sea resin is a vinylidene fluoride/tetrafluoroethylene copolymer, or the transparent resin forming the clad layers is a vinylidene fluoride/tetrafluoroethylene copolymer and the sea resin is a tetrafluoroethylene/hexafluoropropylene/vinylidene fluoride copolymer having a Shore D hardness of 25 or more and 55 or less.

In the present invention, it is preferable that a thermoplastic resin used for the coating layer is a thermoplastic resin having a flexural modulus of 500 MPa or more and 2000 MPa or less. The flexural modulus herein used means the value measured according to ASTM D-790. If the flexural modulus is less than 500 MPa, the cable has poor resistance to repeated bending, and if the flexural modulus is more than 2000 MPa, the cable is difficult to bend at a smaller bend radius. Specifically, preferred examples of such thermoplastic resins may include vinylidene fluoride-based resins and polyamide resins. The vinylidene fluoride-based resins are transparent or opaque resins containing vinylidene fluoride structure units, and may include the above described transparent vinylidene fluoride-based resins. Concrete examples of such vinylidene fluoride resins may include: homopolymers of vinylidene fluoride; and copolymers of vinylidene fluoride with chlorotrifluoroethylene and the like. Preferable examples of the above polyamide resins may include nylon 12, nylon 6/nylon 12 copolymers, and nylon 11. Of these polyamide resins, nylon 12 is particularly preferable as the resin used for the coating layer. The resin used for the coating layer may contain a trace amount of additives such as wax, if necessary. The thickness of the coating layer is preferably 50 μm to 300 μm.

In the present invention, the outside diameter of the multi-core plastic optical fiber strand is preferably 0.1 mm or more and 0.7 mm or less. If the outside diameter of the multi-core plastic optical fiber strand is less than 0.1 mm, the coating layer is very difficult to form, and if the diameter is more than 0.7 mm, the cable has low resistance to repeated flexing.

When forming a coating layer on the outside of the plastic optical fiber strand (hereinafter sometimes referred simply as "strand") in manufacturing the plastic optical fiber cable of the present invention, a method can be preferably employed which coats the optical fiber strand with the hot-melt of the above described transparent resin through a crosshead die.

The plastic optical fiber cable of the present invention can be suitably used for transmitting optical signals. For example, it can be suitably used in a portable electronic equipment, such as mobile phones, PDAs, notebook computers and hand-held game consoles, for connecting their display control circuit board and display section. Further, in mobile phones, it can be suitably used for connecting their camera section and data processing circuit board. When transmitting electric signals in such applications, the circumference of the wires must be covered with a shield to prevent the generation of noise. However, when transmitting optical signals through the optical fiber cable of the present invention, no shield is required even in the high-speed signal transmission, and therefore the cable can be made finer.

Particularly in a portable electronic equipment which includes a first casing and a second casing both having a hinge structure section that allows folding operation to take place, the plastic optical fiber cable of the present invention can be suitably used for connecting the first module in the first casing and the second module in the second casing through the hinge structure section. The hinge structure section may be such that it has a structure such as ball joint and the like, thereby allowing both rotating operation and folding operation to take place.

One example of the connecting section, to which the present invention is related, of a portable electronic equipment having a hinge structure section that allows folding operation to take place will be described by FIG. 2. A first casing 7 and a second casing 8 both having a hinge structure section 9 are rotatably connected with a rotating shaft 12. Also a first module 10 in the first casing 7 and a second module 11 in the second casing 8 are connected with a plastic optical fiber cable 6 of the present invention so as to permit optical communication. In the case of flip phone, for example, the first casing and the first module are the upper casing having a display section and the liquid crystal display module, respectively, and the second casing and the second module are the lower casing having an operation section and the control module (printed circuit board), respectively.

EXAMPLES

Example 1

A strand whose core number per fiber was 37 was fabricated by using poly(methyl methacrylate) as a transparent resin forming each core, tetrafluoroethylene 35% by mass/hexafluoropropylene 19% by mass/vinylidene fluoride 46% by mass copolymer (Shore D hardness: 45) as a transparent resin forming each cladding layer, and vinylidene fluoride 72% by mass/tetrafluoroethylene 28% by mass copolymer (Shore D hardness: 59) as a sea resin. These resins were subjected to spinning at 240° C. with a die that permits composite spinning of three layers at a time, and then subjected to drawing and heat treatment to 2.0 times length to yield a strand having an outside diameter (diameter of sea) of 500 μm (the area of the cross section the core resin accounted for: 75%, the thickness of the cladding layer: 2 μm).

Then, a coating layer was formed by coating the above strand with nylon 12 having a flexural modulus of 1000 MPa through a crosshead die at a coating temperature of 210° C.; thus, a plastic optical fiber cable with an outside diameter of 1.0 mm was obtained.

Firstly, the above plastic optical fiber cable was measured for its optical loss caused by bending. The plastic optical fiber cable was cut to 3 m and bent at its mid-point. A connector was installed on each end of the plastic optical fiber cable, and light with a wavelength of 657 nm from a red LED light source was input to the cable from its one end, and the light output from the other end was monitored. The optical loss was 0.1 dB when the cable was bent with a bend radius of 2 mm to 90°, based on the loss when the cable was not bent.

Then, a repeated flex test was conducted under the following conditions: bend radius: 2 mm, bend angle: ±90°, flex rate: 1 time (cycle)/sec, temperature: 25° C., loading: 125 g. The plastic optical fiber cable did not break after 100,000-time conduction of the above flex test and no change was observed in optical loss.

Example 2

A strand whose core number per fiber was 37 was fabricated by using poly(methyl methacrylate) as a transparent resin forming each core, tetrafluoroethylene 35% by mass/hexafluoropropylene 28% by mass/vinylidene fluoride 37% by mass copolymer (Shore D hardness: 35) as a transparent resin forming each cladding layer, and vinylidene fluoride 72% by mass/tetrafluoroethylene 28% by mass copolymer (Shore D hardness: 59) as a sea resin. These resins were subjected to spinning at 240° C. with a die that permits composite spinning of three layers at a time and then subjected to drawing and heat treatment to 2.0 times length to yield a strand having an outside diameter (diameter of sea) of 400 μm (the area of the cross section the core resin accounted for: 74%, the thickness of the cladding layer: 2 μm).

Then, a coating layer was formed by coating the above strand with nylon 12 having a flexural modulus of 1000 MPa through a crosshead die at a coating temperature of 210° C.; thus, a plastic optical fiber cable with an outside diameter of 0.7 mm was obtained.

The above plastic optical fiber cable was measured for its optical loss caused by bending under the same conditions as in Example 1. The measurement was 0.1 dB or less. A repeated flex test was also conducted under the same conditions as in Example 1 except that loading was 80 g. The results were such that the plastic optical fiber cable did not break after 100,000-time conduction of the above flex test and no change was observed in optical loss.

Example 3

A strand whose core number per fiber was 37 was fabricated by using poly(methyl methacrylate) as a transparent resin forming each core, tetrafluoroethylene 35% by mass/ hexafluoropropylene 19% by mass/vinylidene fluoride 46% by mass copolymer (Shore D hardness: 45) as a transparent resin forming each cladding layer, and vinylidene fluoride 72% by mass/tetrafluoroethylene 28% by mass copolymer (Shore D hardness: 59) as a sea resin. These resins were subjected to spinning at 240° C. with a die that permits composite spinning of three layers at a time and then subjected to drawing and heat treatment to 2.0 times length to yield a strand having an outside diameter (diameter of sea) of 300 μm (the area of the cross section the core resin accounted for: 72%, the thickness of the cladding layer: 2 μm).

Then, a coating layer was formed by coating the above strand with nylon 12 having a flexural modulus of 1000 MPa through a crosshead die at a coating temperature of 210° C.; thus, a plastic optical fiber cable with an outside diameter of 0.7 mm was obtained.

The above plastic optical fiber cable was measured for its optical loss caused by bending under the same conditions as in Example 1. The measurement of the optical loss was 0.1 dB or less. A repeated flex test was also conducted under the same conditions as in Example 1 except that loading was 45 g. The results were such that the plastic optical fiber cable did not break after 100,000-time conduction of the above flex test and no change was observed in optical loss.

Example 4

A strand whose core number per fiber was 37 was fabricated by using poly(methyl methacrylate) as a transparent resin forming each core, tetrafluoroethylene 57% by mass/ hexafluoropropylene 13% by mass/vinylidene fluoride 30% by mass copolymer (Shore D hardness: 54) as a transparent resin forming each cladding layer, and vinylidene fluoride 72% by mass/tetrafluoroethylene 28% by mass copolymer (Shore D hardness: 59) as a sea resin. These resins were subjected to spinning at 240° C. with a die that permits composite spinning of three layers at a time and then subjected to drawing and heat treatment to 2.0 times length to yield a strand having an outside diameter (diameter of sea) of 500 μm (the area of the cross section the core resin accounted for: 75%, the thickness of the cladding layer: 2 μm).

Then, a coating layer was formed by coating the above strand with nylon 12 having a flexural modulus of 1000 MPa through a crosshead die at a coating temperature of 210° C.; thus, a plastic optical fiber cable with an outside diameter of 1.0 mm was obtained.

The above plastic optical fiber cable was measured for its optical loss caused by bending under the same conditions as in Example 1. The measurement of the optical loss was 0.1 dB or less. A repeated flex test was also conducted under the same conditions as in Example 1. The results were such that the plastic optical fiber cable did not break after 100,000-time conduction of the above flex test and no change was observed in optical loss.

Example 5

A strand whose core number per fiber was 37 was fabricated by using poly(methyl methacrylate) as a transparent resin forming each core, tetrafluoroethylene 35% by mass/ hexafluoropropylene 19% by mass/vinylidene fluoride 46% by mass copolymer (Shore D hardness: 45) as a transparent resin forming each cladding layer, and vinylidene fluoride 72% by mass/tetrafluoroethylene 28% by mass copolymer (Shore D hardness: 59) as a sea resin. These resins were subjected to spinning at 240° C. with a die that permits composite spinning of three layers at a time and then subjected to drawing and heat treatment to 2.0 times length to yield a strand having an outside diameter (diameter of sea) of 500 μm (the area of the cross section the core resin accounted for: 75%, the thickness of the cladding layer: 2 μm).

Then, a coating layer was formed by coating the above strand with nylon 12 having a flexural modulus of 1500 MPa through a crosshead die at a coating temperature of 210° C.; thus, a plastic optical fiber cable with an outside diameter of 1.0 mm was obtained.

The above plastic optical fiber cable was measured for its optical loss caused by bending under the same conditions as in Example 1. The measurement of the optical loss was 0.1 dB or less. A repeated flex test was also conducted under the same conditions as in Example 1. The results were such that the plastic optical fiber cable did not break after 100,000-time conduction of the above flex test and no change was observed in optical loss.

Example 6

A strand whose core number per fiber was 37 was fabricated by using poly(methyl methacrylate) as a transparent resin forming each core, tetrafluoroethylene 35% by mass/ hexafluoropropylene 19% by mass/vinylidene fluoride 46% by mass copolymer (Shore D hardness: 45) as a transparent resin forming each cladding layer, and vinylidene fluoride 72% by mass/tetrafluoroethylene 28% by mass copolymer (Shore D hardness: 59) as a sea resin. These resins were subjected to spinning at 240° C. with a die that permits composite spinning of three layers at a time and then subjected to drawing and heat treatment to 2.0 times length to yield a strand having an outside diameter (diameter of sea) of 500 μm (the area of the cross section the core resin accounted for: 75%, the thickness of the cladding layer: 2 μm).

Then, a coating layer was formed by coating the above strand with nylon 6/nylon 12 copolymer having a flexural modulus of 750 MPa through a crosshead die at a coating temperature of 210° C.; thus, a plastic optical fiber cable with an outside diameter of 1.0 mm was obtained.

The above plastic optical fiber cable was measured for its optical loss caused by bending under the same conditions as in Example 1. The measurement of the optical loss was 0.1 dB or less. A repeated flex test was also conducted under the same conditions as in Example 1. The results were such that the plastic optical fiber cable did not break after 100,000-time conduction of the above flex test and no change was observed in optical loss.

Comparative Example 1

A plastic optical fiber cable with an outside diameter of 1.0 mm was obtained by using the same strand as in Example 1 and coating the strand with a low-density polyethylene having a flexural modulus of 30 MPa as a coating layer through a crosshead die at a coating temperature of 140° C.

The above plastic optical fiber cable was subjected to a repeated flex test under the same conditions as in Example 1. After 30,000-time conduction of the flex test, the optical power of the plastic optical fiber cable started to attenuate, and after 50,000-time conduction of the flex test, the cable broke and light guide stopped.

Comparative Example 2

A plastic optical fiber cable was obtained in the same manner as that of Example 1 except that methacrylate fluoride-based resin having a Shore D hardness of 90 was used as a transparent resin forming each cladding layer.

The above plastic optical fiber cable was subjected to a repeated flex test under the same conditions as in Example 1. After 30,000-time conduction of the above flex test, the cable broke and light guide stopped.

Industrial Applicability

The present invention can be suitably used as an optical fiber cable for short-distance optical signal transmission, in particular, as an optical fiber cable for use in a portable electronic equipment, such as mobile phones or mobile computers, which undergoes repeated bending.

The invention claimed is:

1. A plastic optical fiber cable, comprising:
a multi-core plastic optical fiber strand comprising:
    island parts made up of 37 or more and 10000 or less cores each formed of a transparent resin and of at least one cladding layer surrounding each of the cores and formed of a transparent resin with a refractive index lower than that of the transparent resin forming the cores; and
    a sea part surrounding each of the island parts and formed of a resin; and
    a coating layer on an outside of the sea part, which surrounds the multi-core plastic optical fiber strand,
    wherein the transparent resin forming the cores is poly (methyl methacrylate)-based resin,
wherein the resin forming the cladding layer is tetrafluoroethylene/hexafluoropropylene/vinylidene fluoride copolymer having a Shore D hardness of 25 or more and 55 or less,
wherein the resin forming the sea part is vinylidene fluoride/tetrafluoroethylene copolymer;
wherein the resin forming the coating layer is nylon 12 having a flexural modulus of 500 MPa or more and 2000 MPa or less; and
wherein the multi-core plastic optical fiber strand has an outside diameter of 0.1 mm or more and 0.4 mm or less.

2. A connecting method, which is used in a portable electronic equipment having a display control circuit board and a display section in casings,
    comprising connecting the display control circuit board and the display section by using the plastic optical fiber cable according to claim 1.

3. A connecting method, which is used in a portable electronic equipment having a camera section and a data processing section in casings,
    comprising connecting the camera section and the data processing circuit board by using the plastic optical fiber cable according to claim 1.

4. A connecting method, which is used in a portable electronic equipment comprising a first casing and a second casing both having a hinge structure section that allows folding operation to take place,
    comprising connecting a first module in the first casing and a second module in the second casing by passing the plastic optical fiber cable according to claim 1 through the hinge structure section.

5. A connecting method, which is used in a portable electronic equipment comprising a first casing and a second casing both having a hinge structure section that allows rotating operation and folding operation to take place,
    comprising connecting a first module in the first casing and a second module in the second casing by passing the plastic optical fiber cable according to claim 1 through the hinge structure section.

6. The plastic optical fiber cable according to claim 1, wherein the multi-core plastic optical fiber has an outside diameter of 0.3 mm or more and 0.4 mm or less.

* * * * *

UNITED STATES PATENT AND TRADEMARK OFFICE
CERTIFICATE OF CORRECTION

PATENT NO. : 8,472,768 B2  
APPLICATION NO. : 12/598267  
DATED : June 25, 2013  
INVENTOR(S) : Seiji Sasho et al.

Page 1 of 1

It is certified that error appears in the above-identified patent and that said Letters Patent is hereby corrected as shown below:

ON THE TITLE PAGE:

At item (75), Inventors, correct the order of the inventors to read as follows:

--Seiji Sasho, Tokyo (JP); Hajime Munekuni, Tokyo (JP); Hideaki Kai, Tokyo (JP)--.

Signed and Sealed this  
First Day of October, 2013

Teresa Stanek Rea  
*Deputy Director of the United States Patent and Trademark Office*